United States Patent
Jeng et al.

(10) Patent No.: US 7,626,657 B2
(45) Date of Patent: Dec. 1, 2009

(54) MULTI-FUNCTION INTEGRATED POLARIZER/OPTICAL FILM STRUCTURE HAVING FIRST AND SECOND POLARIZER FILMS COATED ON OPPOSITE SIDES OF A FIRST SUBSTRATE AND ONE-HALF A THIRD POLARIZER FILM COATED ON OPPOSITE SIDES OF A SECOND SUBSTRATE

(75) Inventors: Yue-Shih Jeng, Miao Li Hsien (TW); Yuh-Shyang Chen, Taipei (TW); Wei-Chih Liu, Tai Chung (TW); Tsung-Hsiung Wang, Ta Li (TW); Yu-Hsun Wu, Chung Li (TW)

(73) Assignees: Taiwan TFT LCD Association, Hsinchu (TW); Chunghwa Picture Tubes, Ltd., Taoyuan (TW); Au Optronics Corp., Hsinchu (TW); Quanta Display Inc., Tao Yuan Shien (TW); Hannstar Display Corp., Taipei (TW); Chi Mei Optoelectronics Corp., Tainan County (TW); Industrial Technology Research Institute, Hsinchu (TW); Toppoly Optoelectronics Corp., Miao-Li County (TW)

( * ) Notice: Subject to any disclaimer, the term of this patent is extended or adjusted under 35 U.S.C. 154(b) by 229 days.

(21) Appl. No.: 11/131,247

(22) Filed: May 18, 2005

(65) Prior Publication Data
US 2006/0103781 A1    May 18, 2006

(30) Foreign Application Priority Data
Nov. 16, 2004  (TW)  ............... 93135129 A (51) Int. Cl.
*G02F 1/1335*  (2006.01)
(52) U.S. Cl. ...................................... 349/96
(58) Field of Classification Search ............ 349/96–103
See application file for complete search history.

(56) References Cited

U.S. PATENT DOCUMENTS

| | | |
|---|---|---|
| 4,591,512 A | 5/1986 | Racich et al. |
| 5,601,884 A | 2/1997 | Ohnishi et al. |
| 5,739,296 A | 4/1998 | Gvon et al. |
| 5,812,264 A | 9/1998 | Nakamura et al. |
| 6,007,745 A | 12/1999 | Coates et al. |
| 6,049,428 A | 4/2000 | Khan et al. |
| 6,174,394 B1 | 1/2001 | Gvon et al. |
| 6,563,640 B1 | 5/2003 | Ignatov et al. |
| 6,583,284 B1 | 6/2003 | Sidorenko et al. |
| 6,587,168 B2 * | 7/2003 | Jones et al. ............ 349/96 |
| 2004/0105049 A1 * | 6/2004 | Yeh et al. ............... 349/96 |

* cited by examiner

*Primary Examiner*—John Heyman (57) ABSTRACT

A multi-function integrated polarizer/optical film structure and manufacturing method thereof solves the disadvantages of O type or E type polarizers that cannot simultaneously have high polarizing efficiency and high transmittance. The present invention utilizes optical design for a polarizer/optical film having a plurality of material layers on substrates. The present invention is a multi-function integrated polarizer/optical film structure and manufacturing method thereof, that allows an LCD image to have high polarizing efficiency, high transmittance, wide-angle, high contrast and super-film characteristics simultaneously.

12 Claims, 9 Drawing Sheets

MULTI-FUNCTION INTEGRATED POLARIZER/OPTICAL FILM STRUCTURE HAVING FIRST AND SECOND POLARIZER FILMS COATED ON OPPOSITE SIDES OF A FIRST SUBSTRATE AND ONE-HALF A THIRD POLARIZER FILM COATED ON OPPOSITE SIDES OF A SECOND SUBSTRATE

BACKGROUND OF THE INVENTION

1. Field of the Invention

The present invention relates to a multi-function integrated polarizer/optical film structure and manufacturing method thereof, and more particularly, to a structure that can utilize optical design coats, polarizer/optical film with different materials on a plurality of substrates to generate an image with high polarization, high transmittance, wide-angle and high contrast characteristics simultaneously and a manufacturing method thereof.

2. Description of Related Art

Liquid crystal displays (hereinafter referred to as LCDs) use two-piece polarizing films to produce a linearly polarized light to achieve the effect of contrast. A backlight module of the LCD provides primary light. The primary light results from liquid crystal twisted to generate the linearly polarized light when the primary light passes through a first polarization film. When the linearly polarized light has passed through a second polarization film, it will generate the effect of contrast.

In fact, under 5% of the original light reaches the viewer when the original light is passed through the refraction, the reflection and the absorption of the multi-layer materials. The absorption rate and the transmittance of a dichroic polarizer affects the brightness of the LCD. The polarizing film controls liquid crystal display contrast and viewing angle. The degree of polarization of contrast and light loss of viewing angle are adjudged to be the measurement parameters of the polarizing film. Therefore, the polarizing efficiency, the transmittance, the contrast and light loss will decide the display effectiveness of the LCD.

Commercial polarizers typically use O iodine as the predominant type; its principle merit is high polarizing efficiency (99.9%) and transmittance (44%-46%). The main disadvantages of the O iodine polarizers are the following aspects: (1) O iodine polarizers have acute light loss in wide viewing, so much O iodine is needed with a wide-angle film to achieve a high contrast performance; (2) O iodine polarizers have poor temperature and humidity; (3) iodine polarizers' mechanical properties are not strong, so O iodine polarizers must have a protective film pasted onto them to strengthen the outside surface; (4) O iodine polarizers can only be pasted onto the outside of the monitor.

Another type of polarizing film is the E liquid crystal polarizing film, which is a novel polarizer at the present. The E polarizing film mainly has a discotic liquid crystal with absorption when the light passes through the discotic liquid crystal, O polarization light is absorbed, but E polarization light can pass through, thereby achieving a linearly polarized light effect. The E polarizing film polarizing efficiency of the best optics at present is approximately 95% and the transmittance is 40%-44%. The advantages of E polarizing film are: (1) its thickness is approximately only 0.3-0.8 micrometers; (2) it is produced in a liquid crystal cell and sited on the LCD.

In contrast to the iodine series and the E type polarizing film, another coat type of polarizing film is a dye series polarizing film, which is mainly an absorption carrier. The influence absorbency parameters of dye series polarizing film are: (1) its absorption coefficient of dye molecules; (2) its increased dye density and (3) its polarizing film thickness. The main advantages of the dye series polarizing film are: (1) it has good temperature and humidity characteristics; (2) it has a diverse number of coat applying choices and (3) it is produced in a liquid crystal cell.

A prior art iodine series polarizer technology can be found in U.S. Pat. No. 4,591,512, a method for making visible range dichroic polarizer material comprising a uniaxially stretched film of polyvinyl alcohol stained with iodine and treated with a borating solution containing a zinc salt. The mechanical properties, and the temperature and humidity characteristics of the polarizer are not good. Besides the body of iodine polarizing film, a protective film with triacetyl cellulose (TAC) is pasted on the upper and lower side. The present iodine series polarizing film thickness is approximately 200 micrometers The E type polarizer technology of the prior art can be found in, for example, U.S. Pat. Nos. 6,583,284, 6,563,640, 6,174,394, 6,049,428 and 5,739,296. The above technology utilizes coating manufacture to make a polarizing film of the discotic liquid crystal with absorption effect on a surface of a substrate. When a dry process is performed, the polarizing film will become the E type polarizing film. The light produced is E type polarized light when it is passed through the E type, polarizing film.

Another type of polarizing film is the O type polarizing film. The O type polarizing film utilizes a dye coat on the surface of a substrate to forming the polarizing film. The O type polarizer technology of the prior art can be found in, for example, U.S. Pat. Nos. 5,812,264, 6,007,745 and 5,601,884.

Figure 1A:
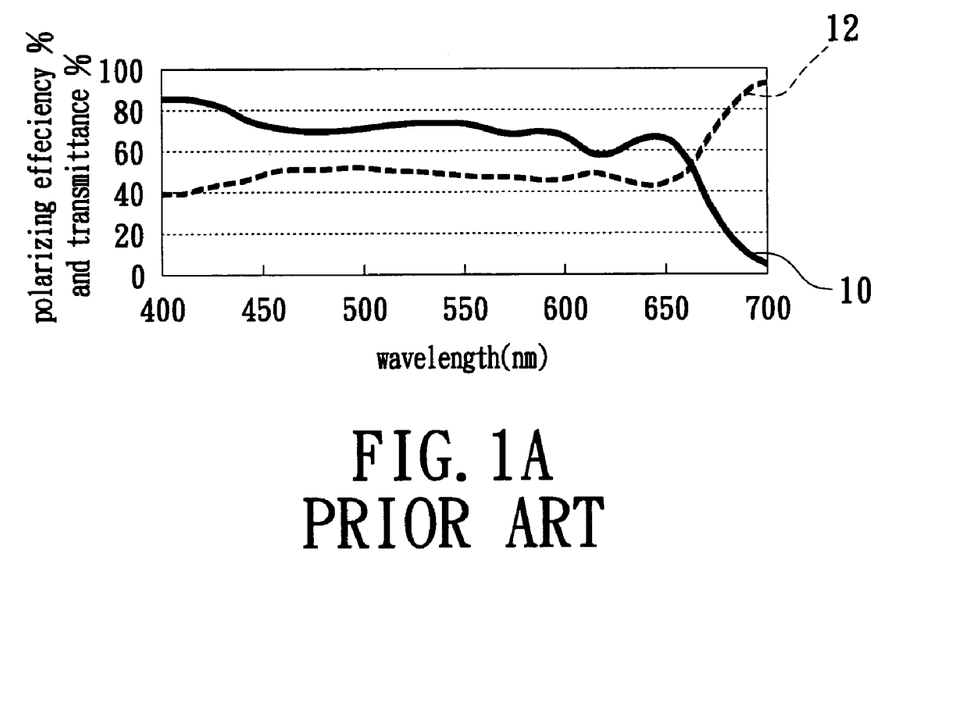
FIG. 1A is a conventional graph of polarizing efficiency and transmittance curves of the O type polarizing film in accordance with the prior art.

A conventional graph of polarizing efficiency and transmittance curves of the O type polarizing film is shown in FIG. 1A. The vertical axis coordinates are polarizing efficiency and transmittance percentage of O type polarizing film. The cross axis coordinate is wavelength. The Figure shows a distribution curve for polarizing efficiency 10 and transmittance 12 for different wavelengths of the O type polarizing film.

Figure 1B:
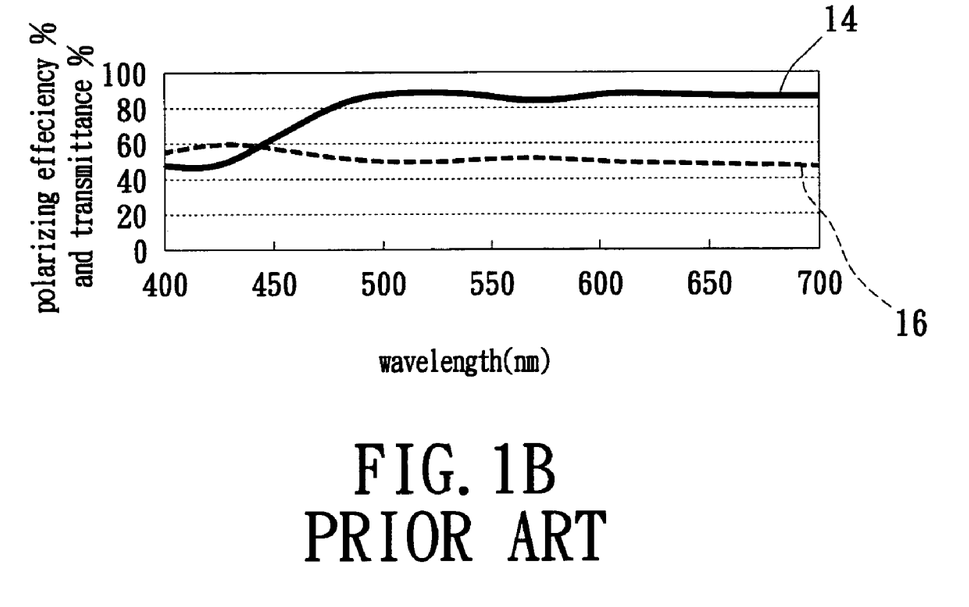
FIG. 1B is a conventional graph of polarizing efficiency and transmittance curves of the E type polarizing film in accordance with the prior art.

A conventional graph of polarizing efficiency and transmittance curves of the E type polarizing film is shown in FIG. 1B. The vertical axis coordinates are polarizing efficiency and transmittance percentage of E type polarizing film. The cross axis coordinate is wavelength. The Figure shows a distribution curve for polarizing efficiency 14 and transmittance 16 for different wavelengths of the E type polarizing film.

SUMMARY OF THE INVENTION

To eliminate the defects of the prior art, the applicant proposes a multi-function integrated polarizer and film structure and a manufacturing method thereof.

The main objective of the present invention is to provide a multi-function integrated polarizer/optical film structure and a manufacturing method. The multi-function integrated polarizer/optical film structure is a multi-layer film. The polarizing efficiency and transmittance of the multi-layer film structure is provided with the advantages of the E type and the O type simultaneously through optical and system design. The multi-layer film using different dye series materials achieves a multi-function integrated polarizer and film structure with high polarizing efficiency and high transmittance. For achieving the objectives above, the present invention provides a manufacturing process for a manufacturing method of a multi-function integrated polarizer/optical film structure, including providing at least one substrate; and coating a polarizer/optical film on said substrate.

The present invention further provides a multi-function integrated polarizer/optical film structure, including a multi-function integrated polarizer/optical film structure, including at least one substrate; and a polarizer/optical film having a plurality of material layers respectively coated on one side of said at least one substrate or opposite sides of said at least one substrate.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

An absorption rate and a polarizing efficiency for light is increased due to a two-superimposition polarizing film thickness greater than a single polarizing film when light is passed therethrough, but a transmittance for light is decreased. The two-superimposition polarizing film problem includes a basic film itself and an optical axis position between films. The optical axis position deviation angle will be absorption parts of light intensity tend to a degree of transmittance for light.

The present invention combines two polarizers of low polarization light to single integrate polarization film with high polarizing efficiency and high transmittance for use in nonlinear optics.

FIGS. 2a-e are polarization film schematic drawings illustrating various types of material by coat applying method on a substrate in accordance with the present invention. A multi-function integrated polarizer/optical film structure is applied to a polarization film, a wide-angle film or a normal optic film as in FIG. 2a. The structure comprises a polarizer/optical film 32 having a plurality of material layers respectively coated on one side of at least one substrate 30. The structure combines two layers of polarizer/optical film stacked on a substrate. The material layers of the polarizer/optical film are arranged on the same side of the substrate and the material of the substrate is a transmission substrate or a non-transmission substrate.

Figure 2A:
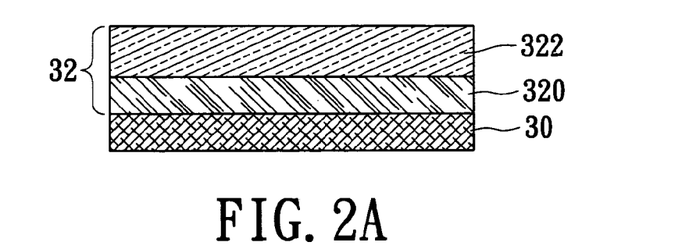
FIGS. 2a-e are polarization film schematic drawings illustrating various types of the material by coat applying method on a substrate in accordance with the present invention.

The material layers of the polarizer/optical film 32 comprise a first polarizer/optical film 320 and a second polarizer/optical film 322. The first polarizer/optical film and the second polarizer/optical film are constituted by various kinds of dye-type material layers, such as O-type film, E-type film, P-type film, S-type film and combinations of the above films. The combination type of the polarizer/optical film could be such as O+O type, E+E type, O+E type, P+S type, P+O type, P+E type, S+O type or S+E type. The polarizer/optical film using the same or different dye-type materials is patterned by applying a coating.

Figure 2B:
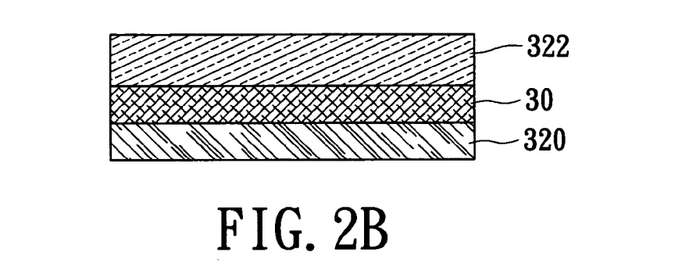
Figure 2C:
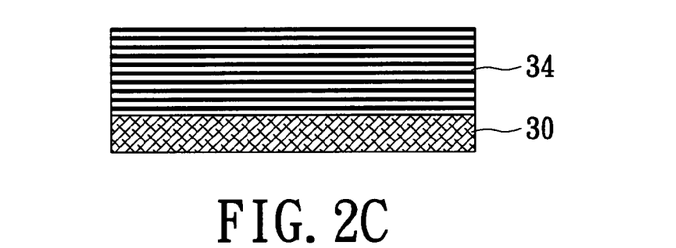

The first polarizer/optical film 320 is on one side of the substrate 30 and the second polarizer/optical film 322 is on another side as shown in FIG. 2b. The first polarizer/optical film 320 and second polarizer/optical film 322 are constituted by various kinds of dye-type material layers. The polarizer/optical film 34 having a plurality of material layers is on the same one of the substrate as shown in FIG. 2c. The polarizer/optical film 34 having a plurality of material layers using the same dye-type material or different dye-type material is combined with the multi-function integrated polarizer/optical film structure.

Figure 2D:
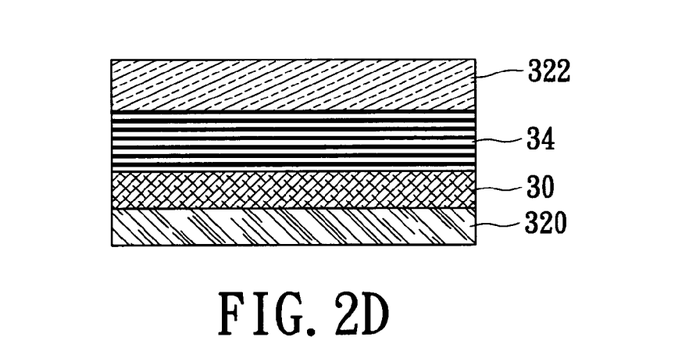
Figure 2E:
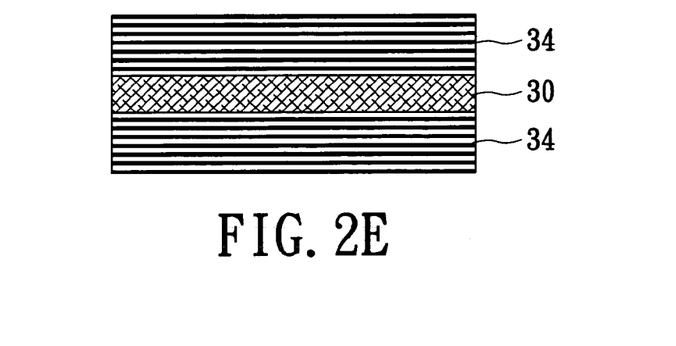

FIG. 2d is based on FIG. 2c. The first polarizer/optical film 320 is on another of the substrates 30 and the second polarizer/optical film 322 is on the polarizer/optical film 34 having a plurality of material layers as shown in FIG. 2d. The polarizer/optical film 34 having a plurality of material layers is on two sides of the substrate as shown in FIG. 2e. The polarizer/optical film 34 having a plurality of material layers using the same dye-type material or different dye-type material are combined with the multi-function integrated polarizer/optical film structure.

Figure 3A:
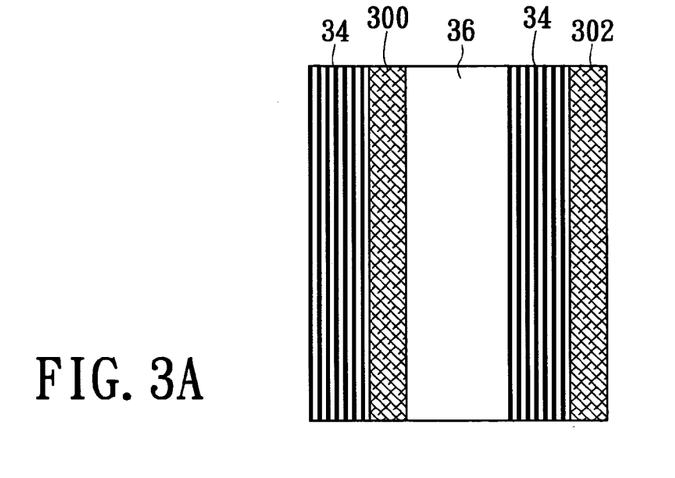
FIGS. 3a-p are schematics drawings for a display unit using a multi-function integrated polarizer/optical film structure in accordance with the present invention.
Figure 3B:
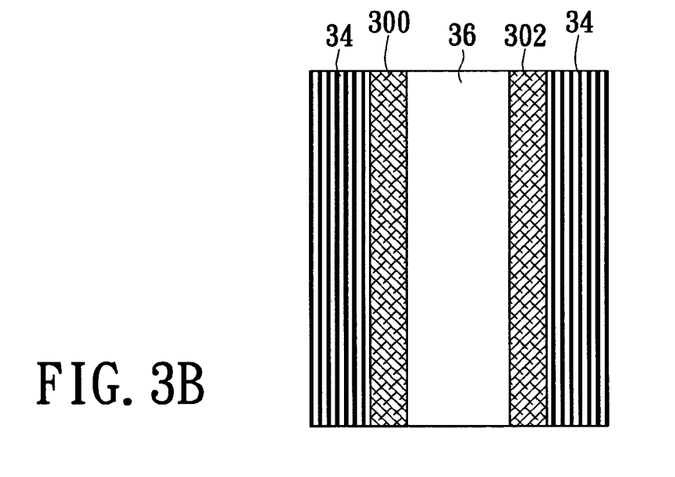
Figure 3C:
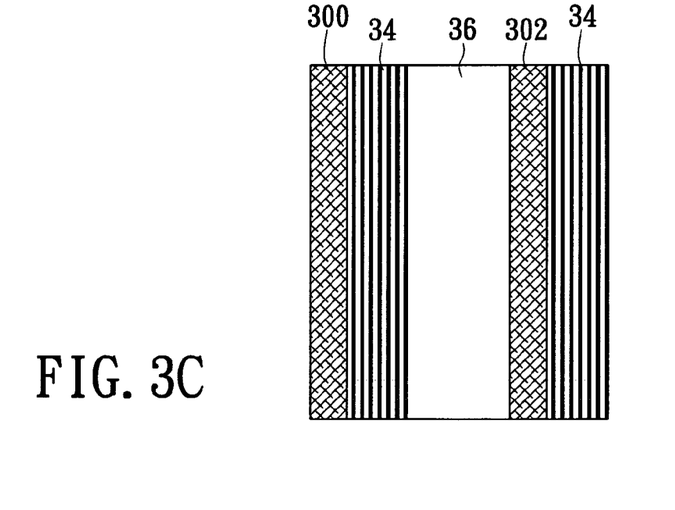
Figure 3D:
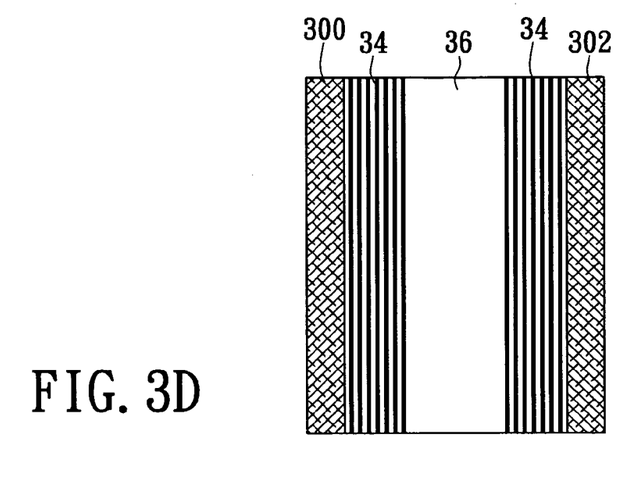
Figure 3E:
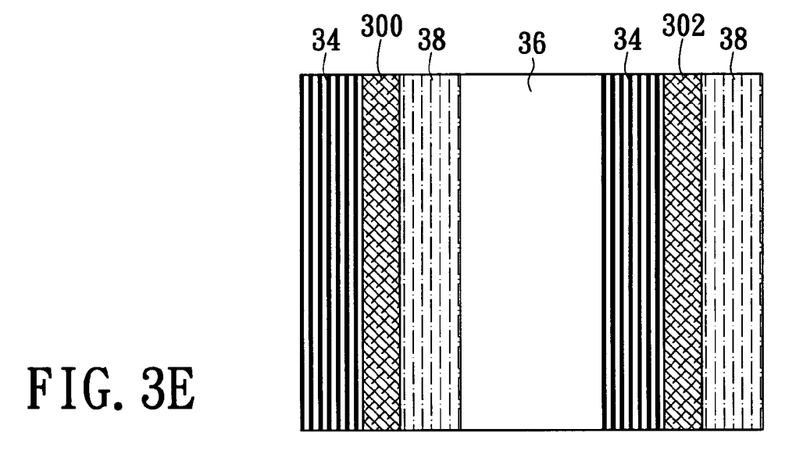
Figure 3F:
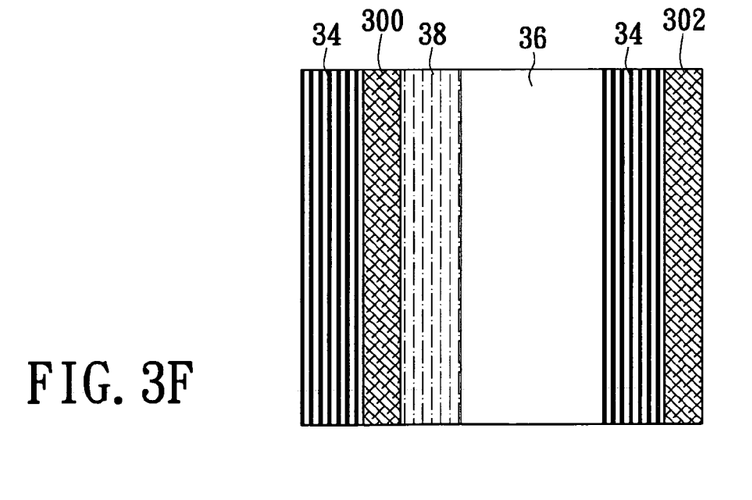
Figure 3G:
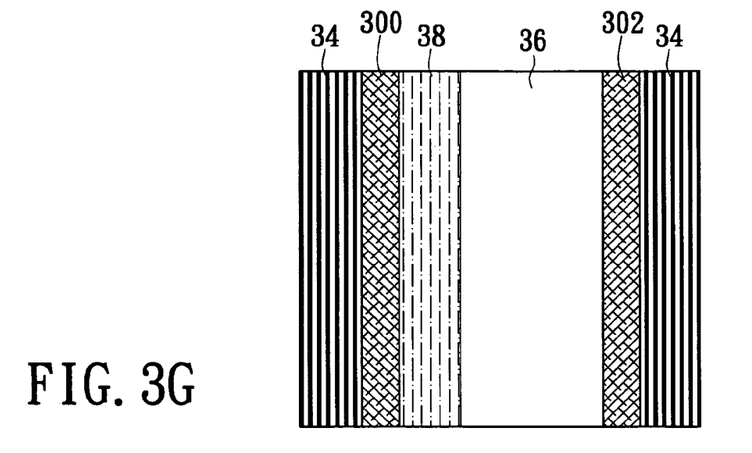
Figure 3H:
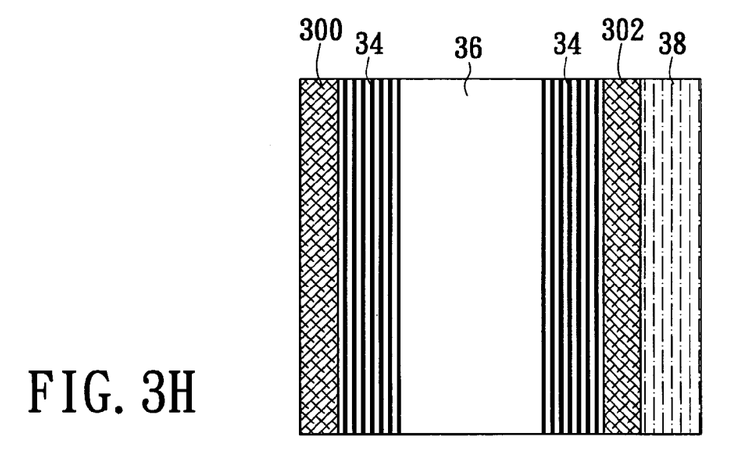
Figure 3I:
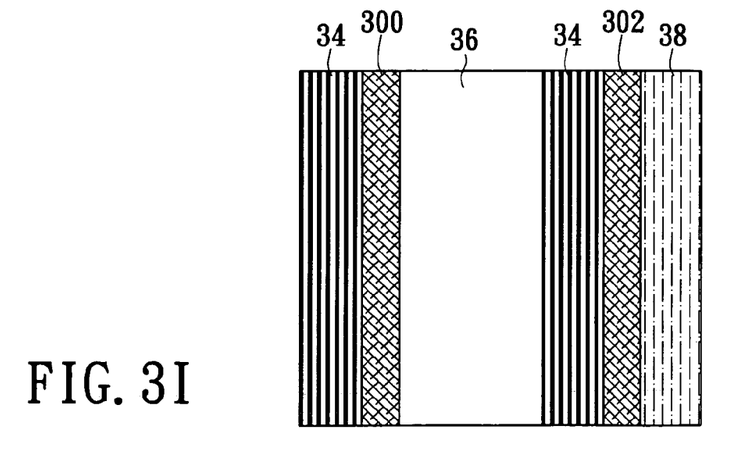
Figure 3J:
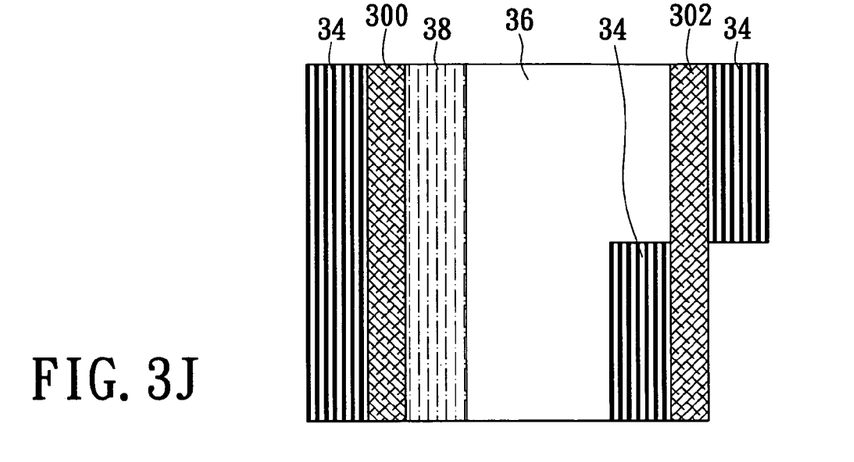
Figure 3K:
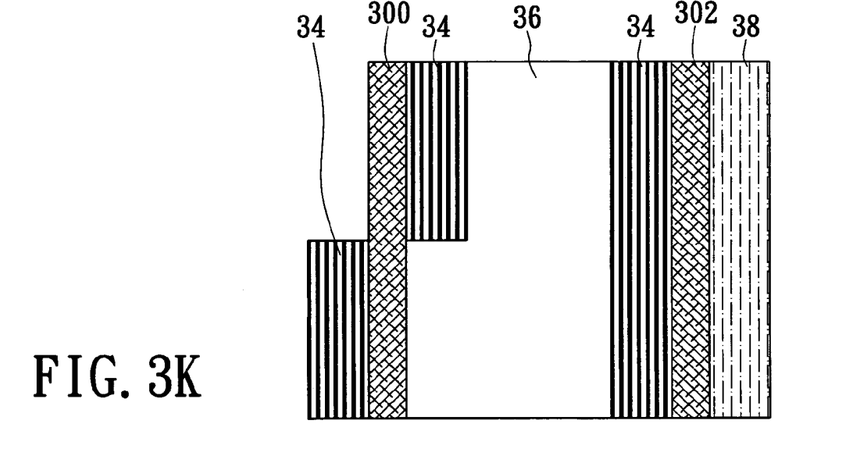
Figure 3L:
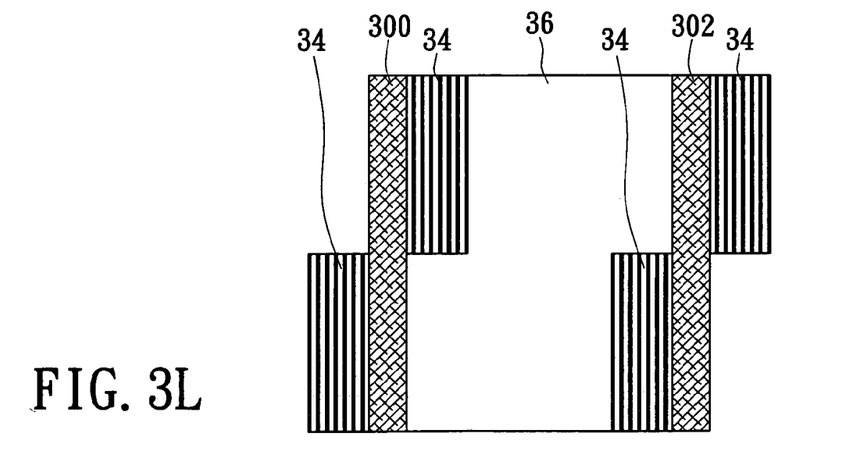
Figure 3M:
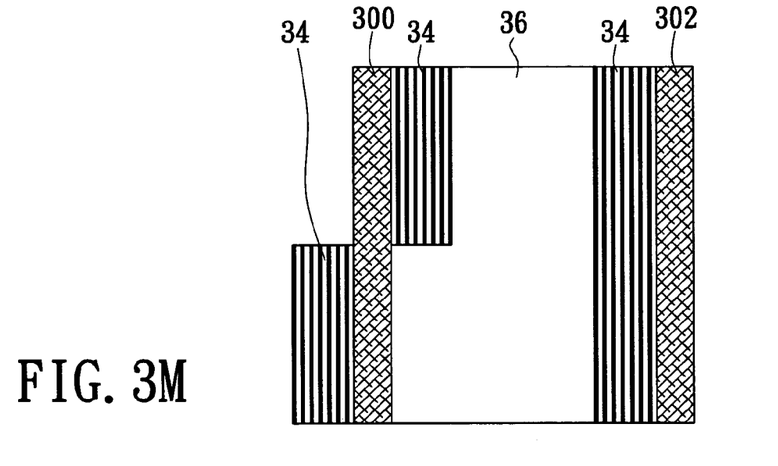
Figure 3N:
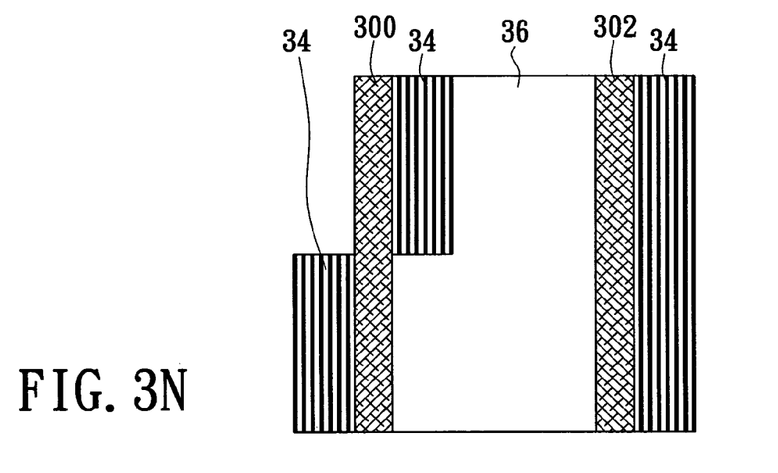
Figure 3O:
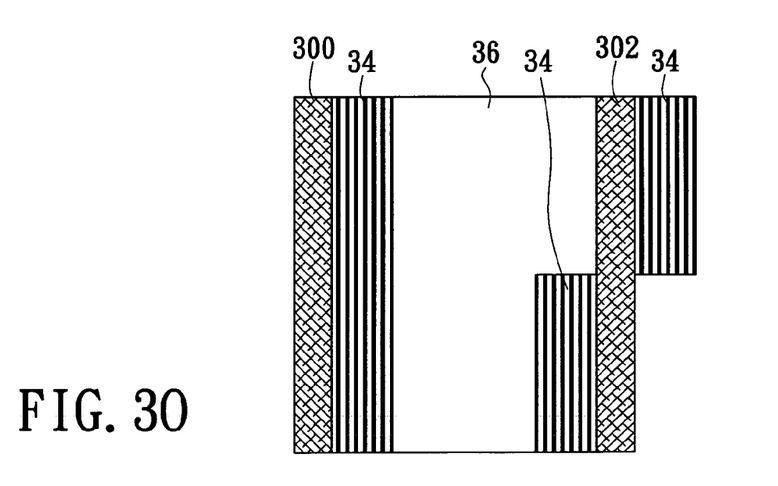
Figure 3P:
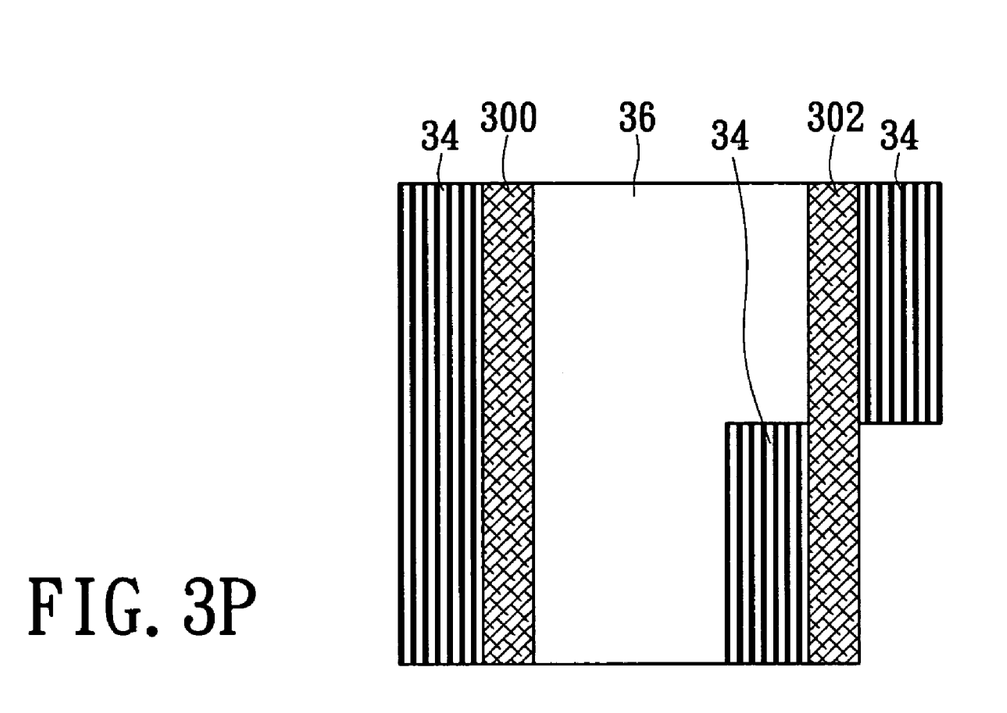

FIGS. 3a-p are schematics drawings of a display unit using a multi-function integrated polarizer/optical film structure in accordance with the present invention. In this embodiment using two substrates is illustrated but it is not limited thereto. The display unit comprises at least one substrate. The at least one substrate is a first substrate 300 and a second substrate 302 as shown in FIG. 3a. The first substrate 300 and the second substrate 302 is a transmission substrate or a non-transmission substrate, wherein the first substrate 300 and the second substrate 302 are in a vertical arrangement. The polarizer/optical film 34 having a plurality of material layers is on either of the sides of the first substrate 300 and the second substrate 302. The polarizer/optical film 34 having a plurality of material layers uses the same dye-type material or different dye-type material. The polarizer/optical film 34 having a plurality of material layers on the second substrate 302 is to face the first substrate 300. A plurality of display fluid media 36 are filled between the first substrate 300 and the second substrate 302. The display fluid medium is liquid crystal, electrophoresis, self-luminous object or other fluid medium for easy display.

The first substrate 300 and the second substrate 302 are in a vertical arrangement and are face-to-face as shown in FIG. 3b. The polarizer/optical film 34 having a plurality of material layers is on another side on the first substrate 300 and the second substrate 302 individually. The polarizer/optical film 34 having a plurality of material layers on the first substrate 300 faces one side of the second substrate 302. Another side of the second substrate 302 is on the polarizer/optical film 34 having a plurality of material layers as shown in FIG. 3c.

The polarizer/optical film 34 having a plurality of material layers on the first substrate 300 faces the polarizer/optical film 34 having a plurality of material layers as shown in FIG. 3d. One side of the first substrate 300 and the second substrate 302 is on the polarizer/optical film 34 having a plurality of material layers. Another side of the first substrate 300 and the second substrate 302 is on a third polarizer/optical film 38 as shown in FIG. 3e. One side of the second substrate 302 is only on the polarizer/optical film 34 having a plurality of material layers and is face-to-face with the third polarizer/optical film 38 of the first substrate 300 as shown in FIG. 3f.

The third polarizer/optical film 38 of the first substrate 300 is face-to-face with the second substrate 302 as shown in FIG.

3g. The polarizer/optical film 34 having a plurality of material layers is on one side of the first substrate 300 and the second substrate 302, wherein the polarizer/optical film 34 having a plurality of material layers of the first substrate 300 is face-to-face with the polarizer/optical film 34 having a plurality of material layers of the second substrate 302 as shown in FIG. 3h. The polarizer/optical film 34 having a plurality of material layers is on one side of the first substrate 300 and the second substrate 302, wherein the polarizer/optical film 34 having a plurality of material layers of the first substrate 300 is face-to-face with the second substrate 302, Another side of the second substrate 302 is on third polarizer/optical film 38 as shown in FIG. 3i.

One side of the first substrate 300 is on the polarizer/optical film 34 having a plurality of material layers and another side is on the third polarizer/optical film 38. A first half of the polarizer/optical film 34 having a plurality of material layers is on one side of the second substrate 302 and another half of the polarizer/optical film 34 having a plurality of material layers is on the other side, wherein the first half of the polarizer/optical film 34 having a plurality of material layers of the second substrate 302 is face-to-face with the third polarizer/optical film 38 of the first substrate 300 as shown in FIG. 3j.

One side of the second substrate 302 is on the polarizer/optical film 34 having a plurality of material layers and another side is on the third polarizer/optical film 38. A first half of the polarizer/optical film 34 having a plurality of material layers is on one side of the first substrate 300 and another half of the polarizer/optical film 34 having a plurality of material layers is on of the another side, wherein the first half of the polarizer/optical film 34 having a plurality of material layers of the first substrate 300 is face-to-face with the polarizer/optical film 34 having a plurality of material layers of the second substrate 302 as shown in FIG. 3k.

A first half of the polarizer/optical film 34 having a plurality of material layers is on one side of the second substrate 302 and another half of the polarizer/optical film 34 having a plurality of material layers is on the other side. A first half of the polarizer/optical film 34 having a plurality of material layers is on one side of the first substrate 300 and a second half of the polarizer/optical film 34 having a plurality of material layers is on the other side. The half of the polarizer/optical film 34 having a plurality of material layers of any side of the first substrate 300 is face-to-face with the half of the polarizer/optical film 34 having a plurality of material layers of any side of the second substrate 302 as shown in FIG. 3l. Half of the polarizer/optical film 34 having a plurality of material layers is on one side of the first substrate 300 and half of the polarizer/optical film 34 having a plurality of material layers is on the other side. The polarizer/optical film 34 having a plurality of material layers is on one side of the second substrate 302. The half of the polarizer/optical film 34 having a plurality of material layers of any side of the first substrate 300 is face-to-face with the polarizer/optical film 34 of the second substrate 302 as shown in FIG. 3m. Half of the polarizer/optical film 34 having a plurality of material layers is on one side of the first substrate 300 and half of the polarizer/optical film 34 having a plurality of material layers is on the other side. The polarizer/optical film 34 having a plurality of material layers is on one side of the second substrate 302. The half of the polarizer/optical film 34 having a plurality of material layers of any side of the first substrate 300 is face-to-face with the second substrate 302 as shown in FIG. 3n.

Half of the polarizer/optical film 34 having a plurality of material layers is on one side of the second substrate 302 and half of the polarizer/optical film 34 having a plurality of material layers is on the other side. The polarizer/optical film 34 having a plurality of material layers is on one side of the first substrate 300, wherein the half of the polarizer/optical film 34 having a plurality of material layers of any side of the second substrate 302 is face-to-face with the polarizer/optical film 34 having a plurality of material layers of the first substrate 300 as shown in FIG. 3o. Half of the polarizer/optical film 34 having a plurality of material layers is on one side of the second substrate 302 and half of the polarizer/optical film 34 having a plurality of material layers is on the other side. The polarizer/optical film 34 having a plurality of material layers is on one side of the first substrate 300, wherein the half of the polarizer/optical film 34 having a plurality of material layers of any side of the second substrate 302 is face-to-face with the first substrate 300 as shown in FIG. 3p.

The multi-function integrated polarizer and film structure of the present invention has the characteristics and advantages of the following aspects:

(1) The multi-function integrated polarizer and film structure have high polarization, high transmittance, high contract and wide viewing characteristic.
(2) The multi-function integrated polarizer and film structure has a super-film structure.
(3) The multi-function integrated polarizer and film structure is produced inside (or outside) a liquid crystal cell.
(4) The multi-function integrated polarizer and film structure is constituted by various kinds of material layers, such as O-type film, E-type film, P-type film, S-type films and combinations of the above films.
(5) The multi-function integrated polarizer and film structure is no limit for material cost, so could reduce product cost.
(6) The polarization and transmittance of the multi-function integrated polarizer and film structure is achieved through optical design.
(7) The multi-function integrated polarizer and film structure is simple to manufacture and easy to combine with optic characteristic polarizing film.
(8) The multi-function integrated polarizer and film structure has O type and E type polarized advantages and solves the disadvantages of O and E types.
(9) The multi-function integrated polarizer and film structure is applied to many kinds of substrate.

Figure 4:
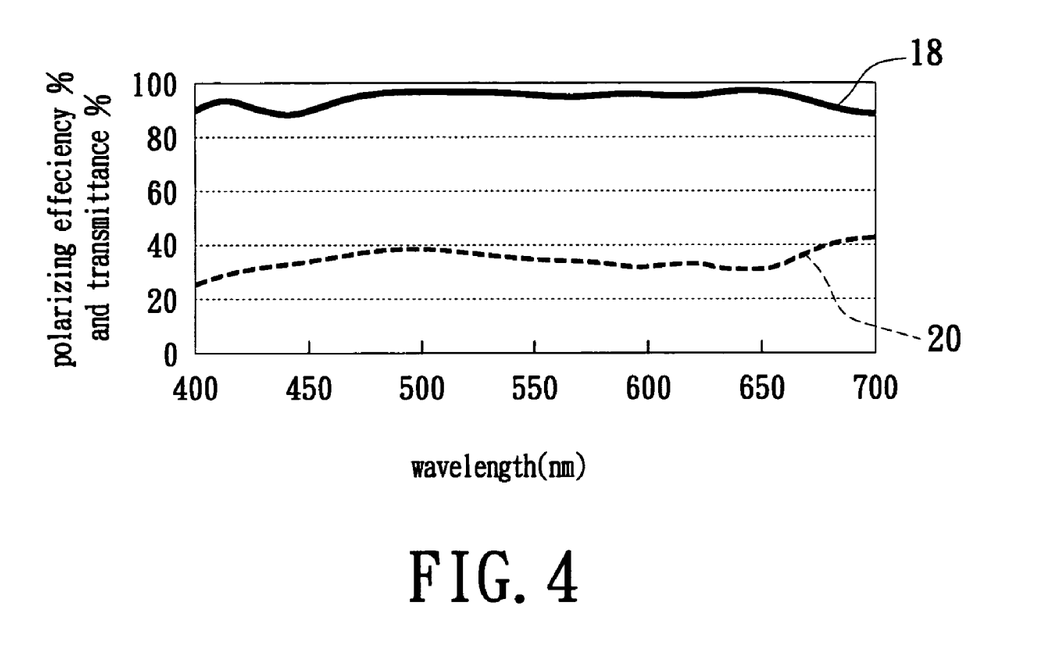
FIG. 4 is a graph of polarizing efficiency and transmittance curves of the multi-function integrated polarizer/optic film in accordance with the present invention.

A polarizing efficiency and transmittance graph of the multi-function integrated polarizer and optic film is shown in FIG. 4. The vertical axis shows percentage coordinates of polarizing efficiency and transmittance of the multi-function integrated polarizer and optic film. The cross axis coordinate is wavelength. The Figure shows a curve for polarizing efficiency 18 and transmittance 20 for different wavelengths of the multi-function integrated polarizer and optic film. The multi-function integrated polarizer and optic film with a high polarizing efficiency and a high transmittance is different from the O type and E type polarization film of the prior art.

The present invention provides a manufacturing process for the multi-function integrated polarizer and optic film. The multi-function integrated polarizer/optical film structure is applied on an optical design having a wide angle, a thin film, a high brightness, a high polarization value and a high transmittance value. The manufacturing process comprises providing at least one substrate, wherein said the at least one substrate is a transmission substrate or a non-transmission substrate. The multi-function integrated polarizer/optical film structure is coated on the at least one substrate. The step of coating is achieved by either slot-die coating, extrusion coating, Mayer rod coating or blade coating. The multi-function integrated polarizer/optical film structure is patterned by this method. The multi-function integrated polarizer/optical film has a plurality of material layers using the same or different dye-type materials. The multi-function integrated polarizer/optical film is coated on a thin film transistor (TFT) of a display by this method.

The multi-function integrated polarizer/optical film uses dye-type materials and is constituted by various kinds of material layers, such as O-type film, E-type film, P-type film, S-type film and combinations of the above films. The polarizing efficiency value and transmittance value of the multi-function integrated polarizer/optical film are designed via an optical parameter. An optical parameter equation for calculating the polarizing efficiency value is given by $$Ep = \frac{T0 - T90}{T0 + T90}.$$

Ep is polarizing efficiency value; T0 is a parallel transmittance of non-polarization through the multi-function integrated polarizer/optical film; and T90 is a vertical transmittance of non-polarization through the multi-function integrated polarizer/optical film.

An optical parameter equation for calculating the transmittance value $$T = \frac{T0 + T90}{2}.$$

is given by T is transmittance; T0 is a parallel transmittance of non-polarization through the multi-function integrated polarizer/optical film; and T90 is a vertical transmittance of non-polarization through the multi-function integrated polarizer/optical film. The polarizing efficiency value and the transmittance value of the multi-function integrated polarizer/optical film structure are obtained through a combination of non-linear optical design and calculation. That is, integrating two low effects polarizer films to a signal polarizer/optical film with high polarization and high transmittance simultaneously.

The present invention of the polarizing efficiency and the transmittance is shown by a nonlinear optics design and redistribution between each side of the film. In fact, the polarizing efficiency and transmittance of the multi-function integrated polarizer/optical film is decided by the whole film. In addition, the designed value of the polarizing efficiency and transmittance is a fixed value, but between the combinations of films has various changes for different environments and material ingredients. The polarizing efficiency and transmittance of the multi-function integrated polarizer/optical film is designed by nonlinear optics. When the films are superimposed, the films cannot eliminate transmittance requirements but also enhance polarizing efficiency.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

REFERENCE NUMERALS

O type polarizing efficiency 10

O type transmittance 12

E type polarizing efficiency 14

E type transmittance 16 optical film polarizing efficiency 18 transmittance 20 substrate 30 first substrate 300 second substrate 302 polarizer/optical film 32,34 first polarizer/optical film 320 second polarizer/optical film 322 display fluid media 36 third polarizer/optical film 38 transmittance polarizing efficiency wavelength

What is claimed is:

1. A multi-function integrated polarizer/optical film structure, comprising:
a first substrate;
a second substrate;
a first polarizer film having a plurality of material layers coated on one side of said first substrate;
a second polarizer film having a plurality of material layers coated on the other side of said first substrate;
a half of a third polarizer film having a plurality of material layers coated on one side of said second substrate thereof; and
the other half of said third polarizer film having a plurality of material layers coated on the other side of said second substrate, wherein the half of said third polarizer film coated on said second substrate is opposite to said second polarizer film coated on the other side of said first substrate,
wherein the polarizer film is selected from the group consisting of P-type film, S-type film and combinations thereof.

2. The structure as claimed in claim 1, wherein said first and second substrates are transmission substrates or non-transmission substrates.

3. The structure as claimed in claim 1, wherein said multi-function integrated polarizer film structure is applied to a polarization film or a wide-view angle film.

4. A display unit using the multi-function integrated polarizer film structure of claim 1.

5. The display unit as claimed in claim 4, wherein said first substrate and said second substrate are transmission substrates or non-transmission substrates.

6. The display unit as claimed in claim 4, wherein said display fluid medium is liquid crystal, electrophoresis, self-luminous object or other fluid medium for easy display.

7. A multi-function integrated polarizer film structure, comprising:
- a first substrate;
- a second substrate;
- a half of first polarizer film having a plurality of material layers coated on one side of said first substrate;
- the other half of said first polarizer film having a plurality of material layers coated on the other side of said first substrate;
- a half of a second polarizer film having a plurality of material layers coated on one side of said second substrate, and
- the other half of said second polarizer film having a plurality of material layers coated on the other side of said second substrate, wherein the half of said second polarizer film coated on said second substrate is opposite to the half of said first polarizer film coated on the one side of said first substrate;
- wherein the polarizer film is selected from the group consisting of P-type film, S-type film and combinations thereof.

8. The structure as claimed in claim 7, wherein said first and second substrates are transmission substrates or non-transmission substrates.

9. The structure as claimed in claim 7, wherein said multi-function integrated polarizer film structure is applied to a polarization film or a wide-view angle film.

10. A multi-function integrated polarizer film structure, comprising:
- a first substrate;
- a second substrate;
- a first polarizer film having a plurality of material layers coated on one side of said first substrate;
- a half of a second polarizer film having a plurality of material layers coated on one side of said second substrate, and
- the other half of said second polarizer film having a plurality of material layers coated on the other side of said second substrate, wherein the half of said second polarizer film coated on said second substrate is opposite to said first substrate or said first polarizer film;
- wherein the polarizer film is selected from the group consisting of P-type film, S-type film and combinations thereof.

11. The structure as claimed in claim 10, wherein said first and second substrates are transmission substrates or non-transmission substrates.

12. The structure as claimed in claim 10, wherein said multi-function integrated polarizer film structure is applied to a polarization film or a wide-view angle film.

* * * * *